Jan. 22, 1963

W. PECHY 3,074,531

ORIENTING APPARATUS

Filed Oct. 31, 1960

INVENTOR.
WILLIAM PECHY.
BY
ATTORNEY.

FIG. 9.
FIG. 10.
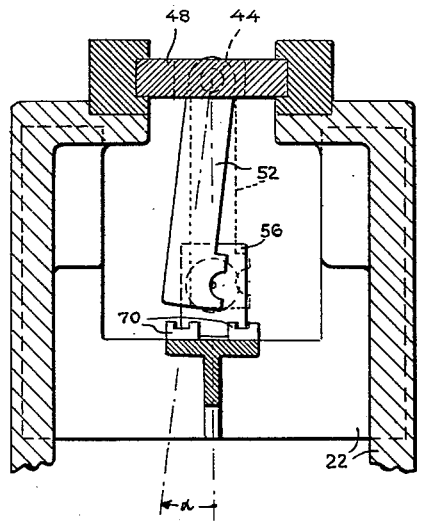
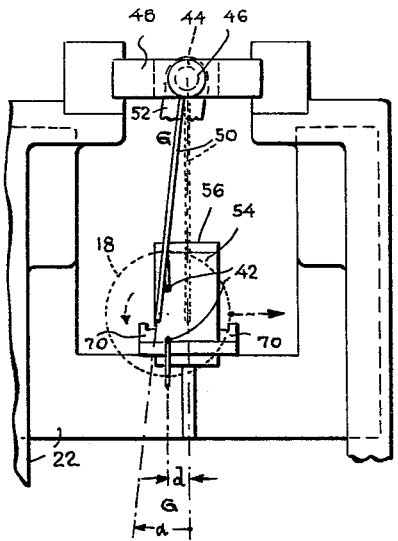
FIG. 11.
FIG. 12.
FIG. 13.
FIG. 14.
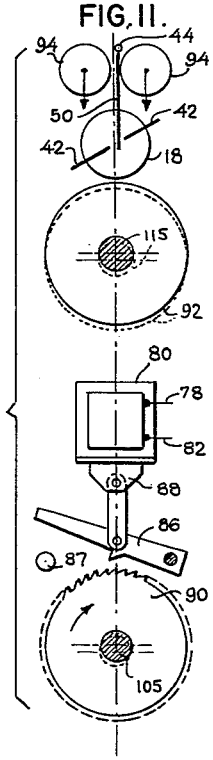
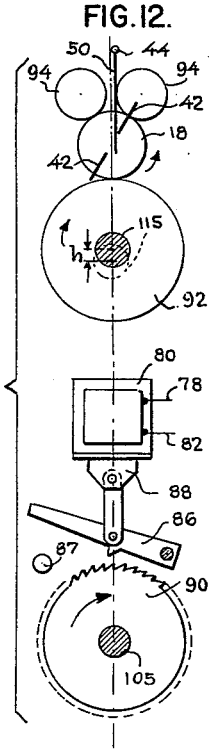
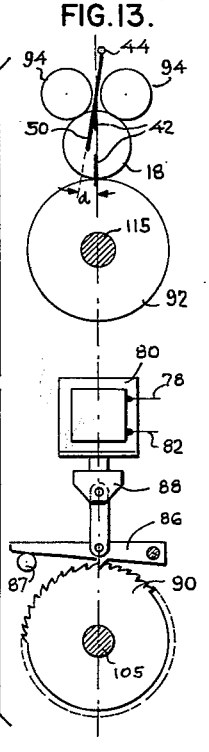
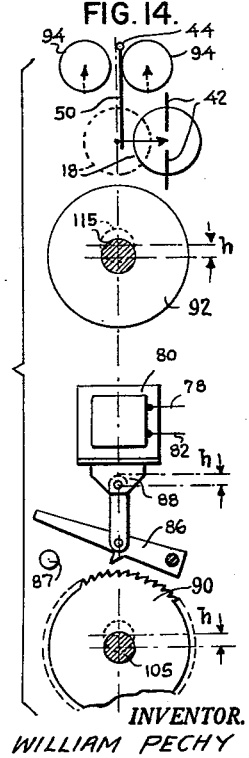
INVENTOR.
WILLIAM PECHY
BY
ATTORNEY.

INVENTOR.
WILLIAM PECHY.
BY
ATTORNEY.

United States Patent Office 3,074,531
Patented Jan. 22, 1963

3,074,531
ORIENTING APPARATUS
William Pechy, Manasquan, N.J., assignor to Westinghouse Electric Corporation, East Pittsburgh, Pa., a corporation of Pennsylvania
Filed Oct. 31, 1960, Ser. No. 66,072
6 Claims. (Cl. 198—33)

The present invention relates to the manufacture of fluorescent lamps and, more particularly, to apparatus for orienting the lead wires of a fluorescent lamp preparatory for a lead-wire straightening operation and a subsequent base-threading operation.

Heretofore, when a vertical-type threading machine (of the type shown in U.S. Patent No. 2,720,690, issued October 18, 1955 to D. Mullan et al.) was employed, it was not necessary to orient the lead wires of a fluorescent lamp prior to the straightening of the lead wires, because the associated exhaust machine, transfer device and threading machine were all driven by an integrated synchronized drive. After the lead wires were oriented on the exhaust machine, such lead wires remained in the oriented position throughout the transfer and subsequent threading operations.

However, in order to increase the production rate of the Mullan et al. machine (from its 1200 threaded lamps per hour) to a production rate of 3600 threaded lamps per hour, a horizontal-type threading machine is currently employed. This horizontal-type threading machine receives the fluorescent lamps from an inclined loading platform with the lead wires at both ends of such lamps aligned relative to each other but randomly disposed at various angles with respect to a desired reference plane in which such lead wires must be positioned to properly straighten such lead wires and to then thread a base onto the straightened lead wires.

It is the general object of the present invention to avoid and overcome the foregoing and other difficulties of and objections to prior-art practices by the provision of lead-wire orienting apparatus for a threading machine, which orienting apparatus will efficiently orient the lead wires in a desired reference plane preparatory for a lead-wire straightening operation, while such threading machine is operating at a high production rate.

The aforesaid object of the present invention, and other objects which will become apparent as the description proceeds, are achieved by providing orienting apparatus comprising detecting means adjacent the lead wires on one end of a fluorescent lamp, lamp-rotating means for rotating the lamp and for moving the lead wires from the random plane in which they are usually disposed to a desired reference plane, a light source for producing a beam of light, light-responsive means aligned with the light source for receiving the beam of light, and light-shielding means connected to the detecting means and movable therewith from a light-shielding position to a light-transmitting position. The shielding means is normally disposed in the light-shielding position between the light source and the light-responsive means to interrupt the beam of light from the light source to the light-responsive means. The detecting means and the shielding means are movable by one of the adjacent lead wires during movement of the latter from the random plane to the reference plane to position the shielding means in the light-transmitting position when the lead wires are disposed substantially in the reference plane, thereby permitting actuation of the light-responsive means by the beam of light. Interrupting means, operatively associated with the lamp-rotating means and the light-responsive means, are then responsive to actuation of the light-responsive means to stop the lamp-rotating means and rotation of the lamp and the lead wires when the lead wires are disposed substantially in the reference plane.

For a better understanding of the present invention reference should be had to the accompanying drawings, wherein like numerals of reference indicate similar parts throughout the several views and wherein:

FIG. 9 is an enlarged vertical-sectional view along the line IX—IX of FIG. 8 in the direction of the arrows;

FIG. 10 is a view similar to FIG. 9 along the line X—X of FIG. 8 in the direction of the arrows;

FIGS. 11–14 are diagrammatic side-elevational views illustrating the operation of the lamp-rotating mechanism and the associated interrupting means;

Although the orienting apparatus of the present invention is operable to orient lead wires of discharge and incandescent lamps in general, the apparatus of the present invention is particularly adapted for orienting the lead wires of a fluorescent lamp preparatory for a lead-wire straightening operation, and hence it has been so illustrated and will be so described.

Figure 1:
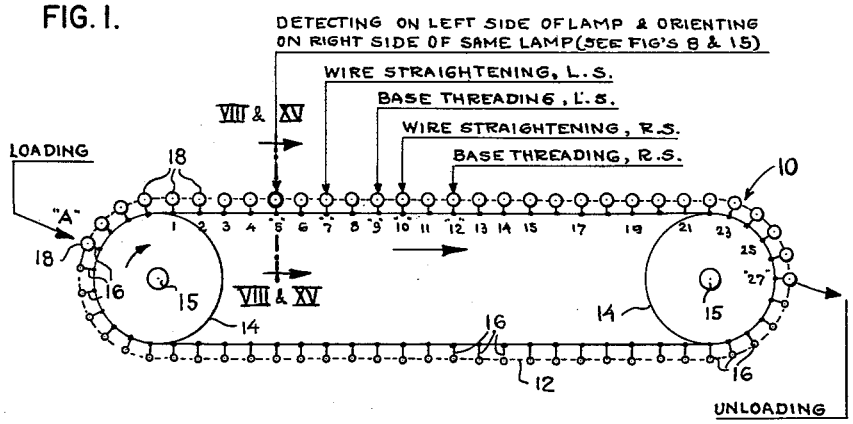
FIG. 1 is a diagrammatic side-elevational view of a horizontal-type threading machine incorporating the lead-wire orienting apparatus of the present invention.

With specific reference to the form of the present invention illustrated in the drawings, and referring particularly to FIG. 1, a base-threading machine is indicated generally by the reference numeral 10.

This base-threading machine 10 (FIG. 1) has a pair of endless chains 12 disposed substantially parallel to each other in a horizontal plane and supported by sprockets 14 which are mounted on each end of shafts 15. Such endless chains 12 are provided with a plurality of transversely registering heads 16 for receiving and supporting exhausted fluorescent lamps 18. The registering heads 16 are indexed through a number of stations by a conventional indexing mechanism (not shown, but which may be of the type disclosed in U.S. Patent No. 2,569,852 issued October 2, 1951 to J. H. Green) at an index rate operable to provide 3600 threaded lamps 18 per hour. These endless chains 12 ride on (and are supported by) support tracks 20 (FIGS. 6, 7, 8 and 15) affixed to a frame 22 of the threading machine 10 along the upper horizontal path of movement of the endless chains 12 adjacent Stations "4"–"19."

Heads

Figure 7:
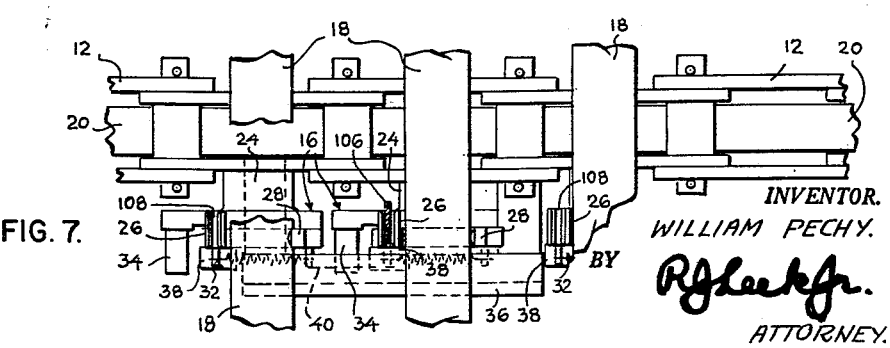
FIG. 7 is a fragmentary plan view along the line VII—VII of FIG. 6 in the direction of the arrows.
Figure 8:
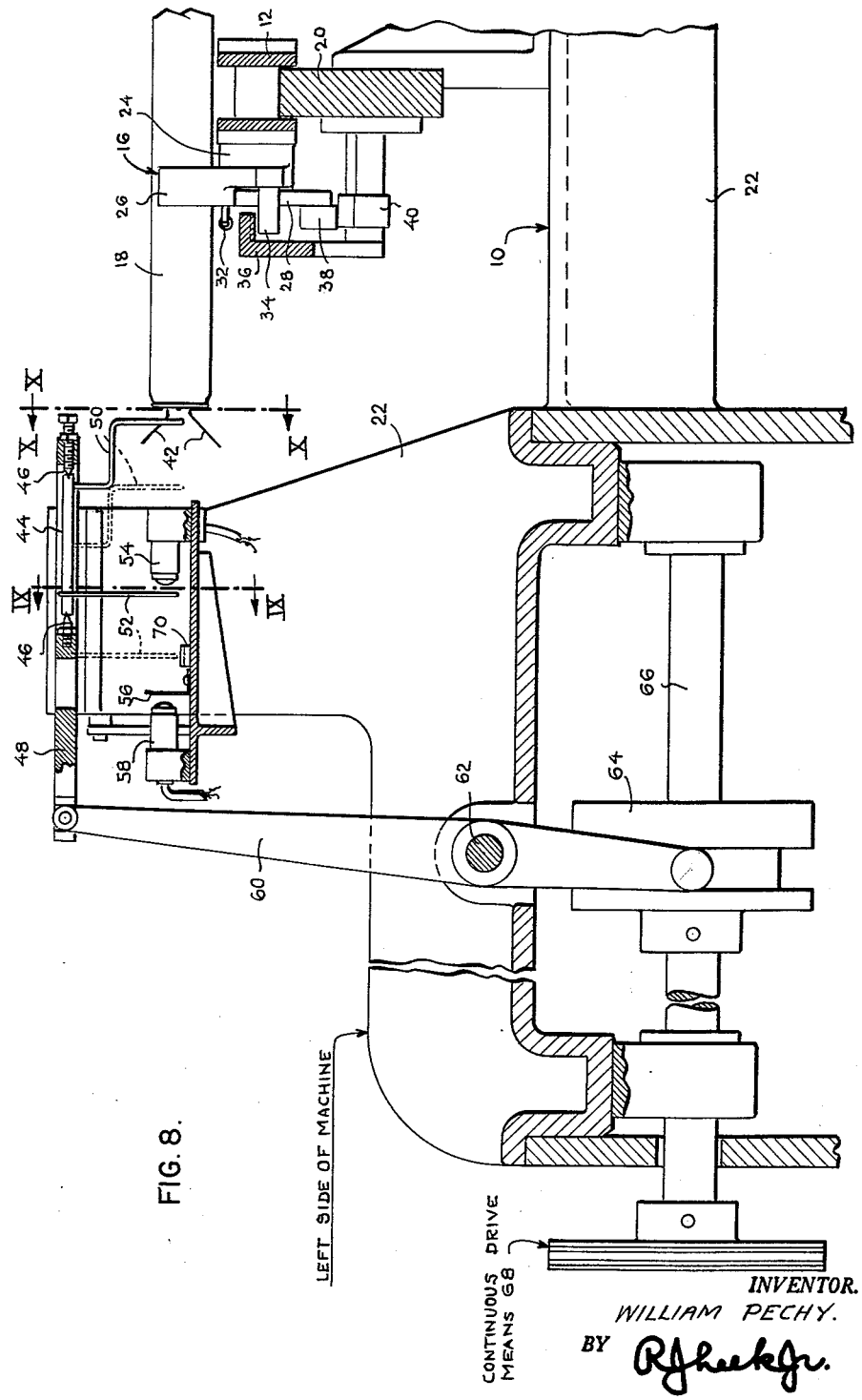
FIG. 8 is a vertical-sectional view along the line VIII—VIII of FIG. 1 in the direction of the arrows of the left side of the threading machine and the detecting mechanism at Station 5, the lead-wire orienting station, after the lead wires have been oriented.
Figure 15:
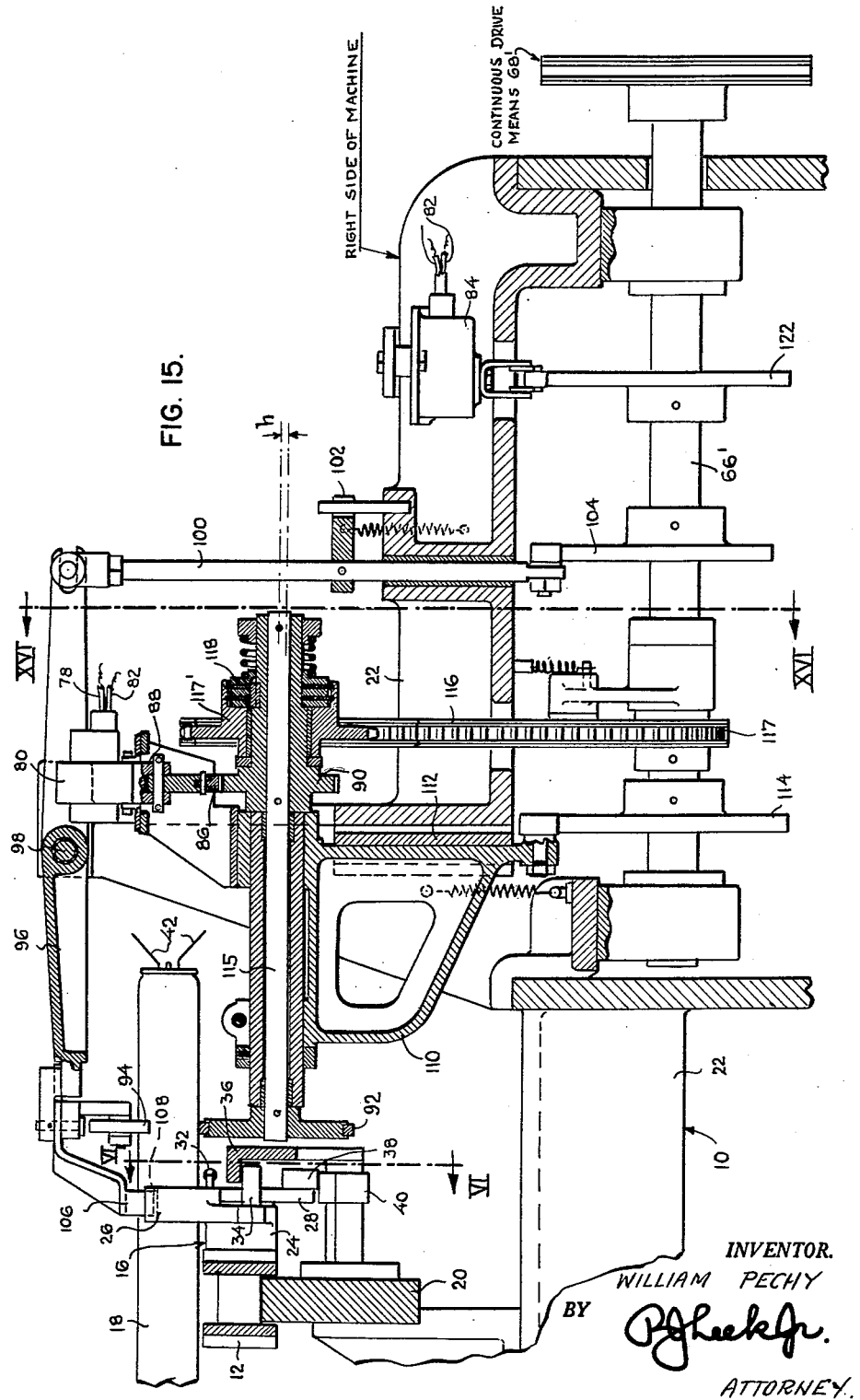
FIG. 15 is a view similar to FIG. 8 along the line XV—XV of FIG. 1 in the direction of the arrows, constituting a continuation of such FIG. 8 and showing the right side of the threading machine at Station "5," the lead-wire orienting station, the lamp-rotating mechanism, interrupting means and associated mechanisms.
Figure 16:
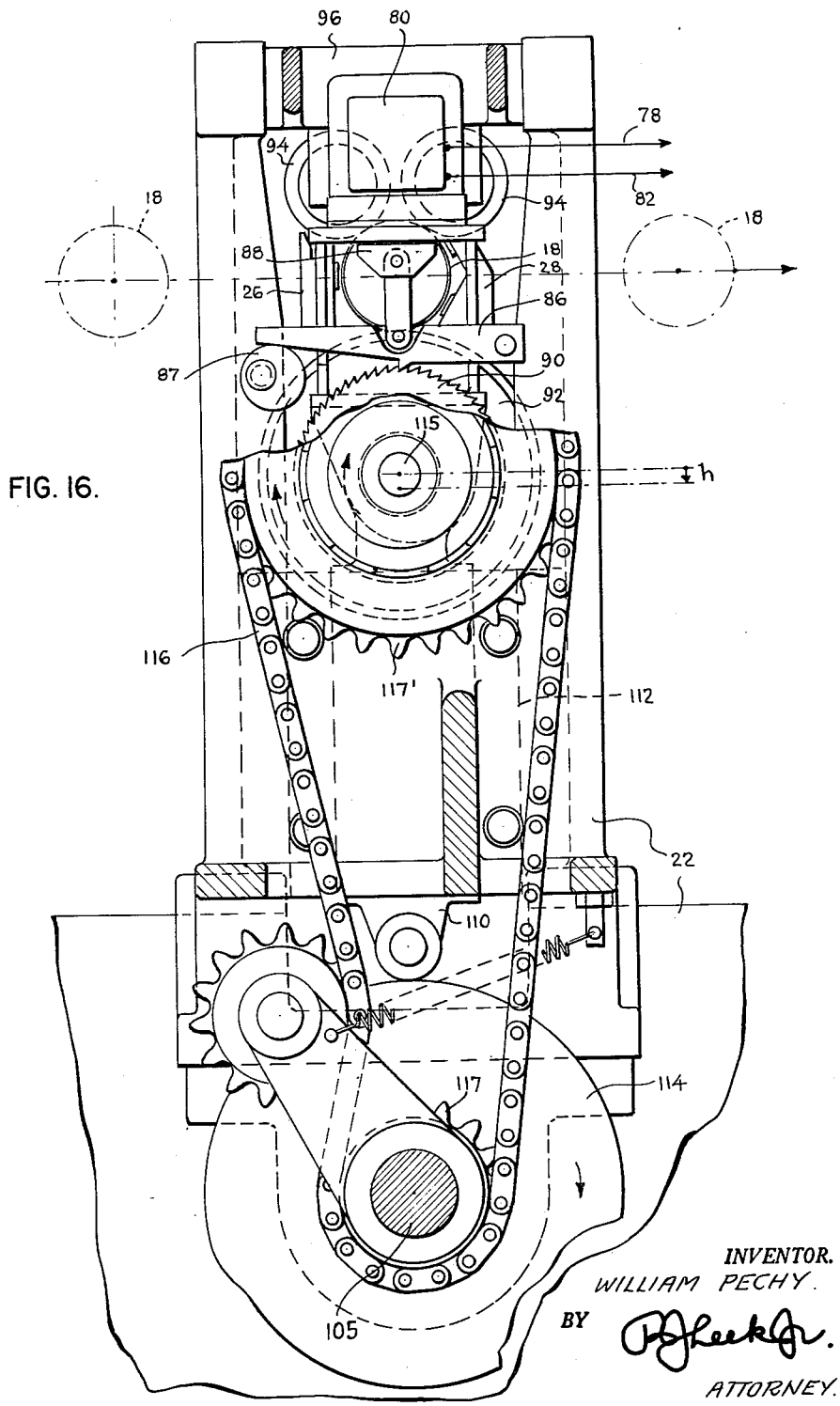
FIG. 16 is a vertical-sectional view along the line XVI—XVI of FIG. 15 in the direction of the arrows.

As shown in FIGS. 7, 8 and 15, each of the heads 16 comprises a mounting bracket 24 affixed to the endless chain 12, a fixed jaw 26 secured to the mounting bracket 24 and a movable jaw 28 pivoted at 30 on the mounting bracket 24 and biased by a spring 32 toward such fixed jaw 26.

At Station "A" (FIG. 1) a fluorescent lamp 18 rolls down a gravity-type loading platform (not shown) into a pair of registering open heads 16. The movable jaws 28 are closed about the ends of the supported fluorescent lamp 18 by cam means (not shown) at Station "3" and thereafter the secured fluorescent lamp 18 is indexed to Station "4." Adjacent Station "4" and Station "5," the lead-wire orienting station, a pin 34 (FIGS. 6, 7, 8 and 15) projecting from each oppositely disposed mounting bracket 24 engages a hold-down cam 36 on the frame 22, which hold-down cam 36 seats the associated head 16 on the adjacent support track 20 and opposes any rocking movement of the head 16 during opening of the movable jaws 28 between Stations "4" and "5."

Between Stations "4" and "5" (FIGS. 6 and 7) and after engagement of the pins 34 with the cams 36, a roller 38 on each oppositely disposed movable jaws 28 engages a stationary jaw-operating cam 40 thus opening each movable jaw 28 and releasing the fluorescent lamp 18 for the lead-wire orienting operation which is performed by the lead-wire orienting apparatus of the present invention.

This lead-wire orienting apparatus comprises essentially a lead-wire detecting mechanism (FIGS. 8–10) and a lamp-rotating mechanism (FIGS. 11–16).

Detecting Mechanism

Figure 2:
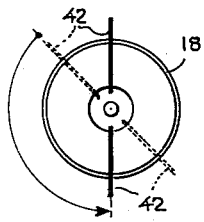
FIG. 2 is an end view of a fluorescent lamp showing the random (dotted-line) position in which the lead wires of the fluorescent lamp are presented to the orienting apparatus and further showing the final (solid-line) oriented position of such lead wires.
Figure 3:
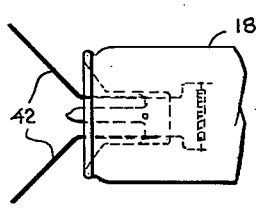
FIG. 3 is a fragmentary side-elevational view of the fluorescent lamp showing the final oriented position of the lead wires.

As shown in FIG. 8, lead wires 42 projecting from the end of the now-released fluorescent lamp 18 adjacent the detecting mechanism may be disposed substantially in one plane, indicated by the dotted-line position of FIG. 2.

Since the lead wires 42 (on the end of the fluorescent lamp 18 adjacent such detecting mechanism) are in the same plane as the lead wires 42 on the opposite end of the fluorescent lamp 18 (FIG. 15), orientation or movement of the lead wires 42 shown in FIG. 8 to a reference plane, the desired solid-line position shown in FIG. 2, will automatically orient the lead wires 42 on the other end of the lamp 18 and shown in FIG. 15.

As shown in FIG. 8, the detecting mechanism (FIGS. 8–10 and 18) has a rod 44 pivoted on the frictionless bearings 46 carried by a slide 48 reciprocable in the frame 22. Such pivotable rod 44 carries a detecting means, such as a detector 50 (which is disposed, when in the solid-line position of FIG. 8, in the path of rotatable movement of the lead wires 42) and a light-shielding means, such as a shield 52 which is disposed between a light source 54, and a focusing shield 56. This shield 56 is mounted on the frame 22. Also mounted on the frame 22 to the left of the focusing shield 56 (FIG. 8) is a light-responsive photoelectric cell 58.

Figure 17:
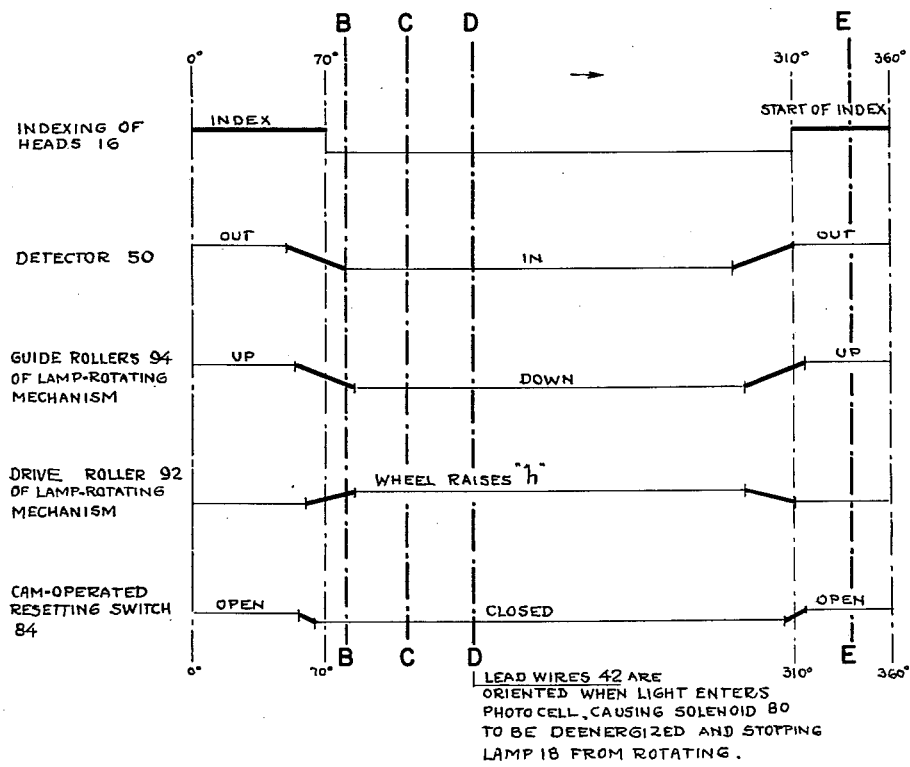
FIG. 17 is a diagrammatic view illustrating the operating sequence of the components of the orienting apparatus with respect to the indexing of the threading machine.

As shown in FIG. 17, near the end of the indexing movement of the heads 16 and the fluorescent lamp 18 carried thereby into Station "5," the lead-wire orienting station, the slide 48, the rod 44 (carried by the slide 48) and both the shield 52 and detector 50 on the rod 44 are moved by a detector-reciprocating mechanism from the dotted-line position (FIG. 8) to the solid-line position in such figure. While in the solid-line position the detector 50 is disposed in the rotational path of movement of the randomly disposed lead wires 42, which lead wires 42 and the lamp 18 are then rotated continuously in clockwise direction (FIG. 18) and counter clockwise direction (FIGS. 10 and 12) by the lamp-rotating mechanism (FIGS. 11–14, 15 and 16) as hereinafter described in detail.

This detector-reciprocating mechanism (FIG. 8) comprises a lever 60 pivoted at 62 and driven by a cam 64 on a cam shaft 66 (FIG. 8), which cam shaft 66 is continuously rotated by a continuous drive means 68.

While the shield 52 is in the dotted-line position of FIG. 8, magnets 70 on the frame 22 position the shield 52 in a vertical position similar to its dotted-line position shown in FIG. 9. As a result the detector 50 (dotted-line position, FIG. 10) is aligned in a vertical position thus assuring presentment of the detector 50 into the rotational path of movement of the lead wires 42 parallel to the vertical centerline "G—G" (FIG. 10) of the lamp 18 and spaced a distance "d" therefrom.

The initial presented position of the detector 50 (dotted-line position, FIG. 10) is offset this distance "d" from the vertical centerline "G—G" (FIG. 10) of the lamp 18, so that when the lead wires 42 are in the final oriented position shown in FIG. 10, the detector 50 and hence the shield 52 (FIG. 9) will have been rotated clockwise through an angle "α" with the result that light from the light source 54 then passes beyond the shield 52, through the focusing shield 56 and into the photo-electric cell 58 disposed in a "photocell" circuit.

Figure 18:
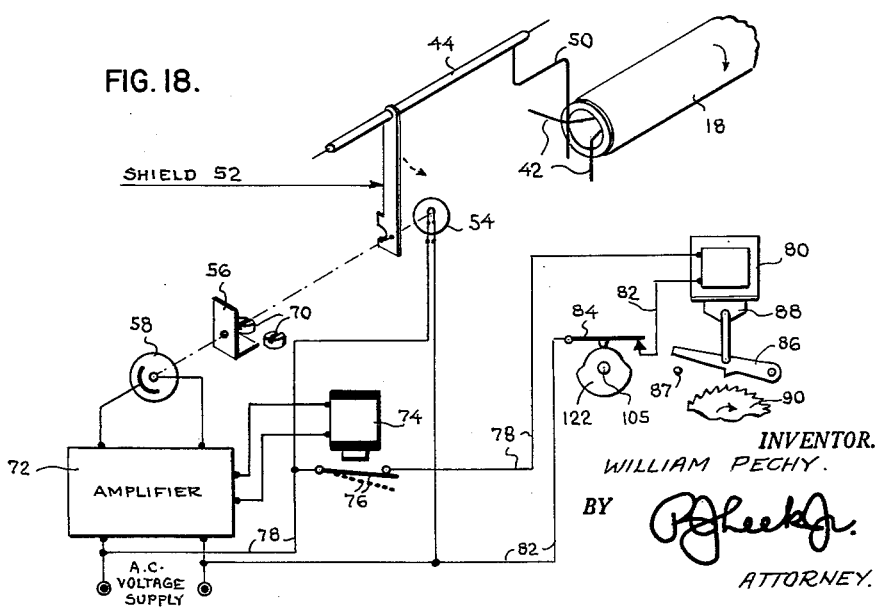
FIG. 18 is a diagrammatic perspective view of the orienting apparatus at the start of the orienting operation.

As shown in FIG. 18, an associated amplifier 72 in this "photocell" circuit is connected to a suitable voltage supply (indicated by the legend "A.C. voltage supply"). The signal (produced by the incidence of light from the light source 54 on the cell 58) is fed into the amplifier 72 and the amplified signal is fed from the output side of the amplifier 72 to a relay 74. This relay 74 has a normally-closed contact 76 disposed in a "solenoid" circuit.

This "solenoid" circuit comprises a line 78 extending from one side of the "A.C. voltage supply" through the normally-closed contact 76 to one side of a coil of a solenoid 80 and a conductor 82 connecting the other side of the coil of the solenoid 80 through a cam-operated resetting switch 84 to the other side of the "A.C. voltage supply."

In summarizing the operation of the detecting mechanism, first the detector 50 and the shield 52 are vertically aligned by the magnets 70 and the detector 50 is moved into the path of movement of the lead wires 42 (FIG. 10). Thereafter the lamp-rotating mechanism begins to rotate the lamp 18 and the lead wires 42 attached thereto so that one of the lead wires 42 engages and rotates the detector 50 (and the shield 52 attached thereto) through an angle "α" by the time such lead wires 42 reach the final oriented positions (FIGS. 10 and 13). Incident light from the light source 54 is admitted by the rotated shield 52 through the focusing shield 56 and strikes the photoelectric cell 58 which feeds an input signal into the energized amplifier 72. The amplified output signal from the amplifier 72 de-energizes the relay 74 with resultant opening of the normally-closed contacts 76 in the "solenoid" circuit and attendant deenergization of the solenoid 80. As a result a pawl 86 carried by an armature 88 of the solenoid 80 is released and drops (by its own weight) downwardly (as limited by a stop 87, FIGS. 11–14, 16) into engagement with a ratchet wheel 90 of the lamp-rotating mechanism thereby interrupting the rotation of the lamp 18 and stopping the lead wires 42 on both ends of the lamp 18 in the desired oriented position (FIGS. 2 and 10).

Lamp-Rotating Mechanism

In order to rotate the fluorescent lamp 18 (FIG. 15), the lamp-rotating mechanism has a pair of guide rollers 94 and a drive roller 92 which are moved into engagement with the fluorescent lamp 18 by a first and second reciprocating means respectively, while the detector 50 (FIG. 17) is moving into the rotational path of movement of the lead wires 42.

Figure 5:
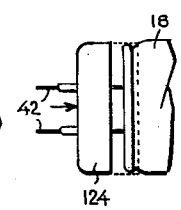
FIG. 5 is a view similar to FIGS. 3 and 4 illustrating the threading of a base onto the straightened lead wires at Station "9," a base-threading station of the threading machine.
Figure 6:
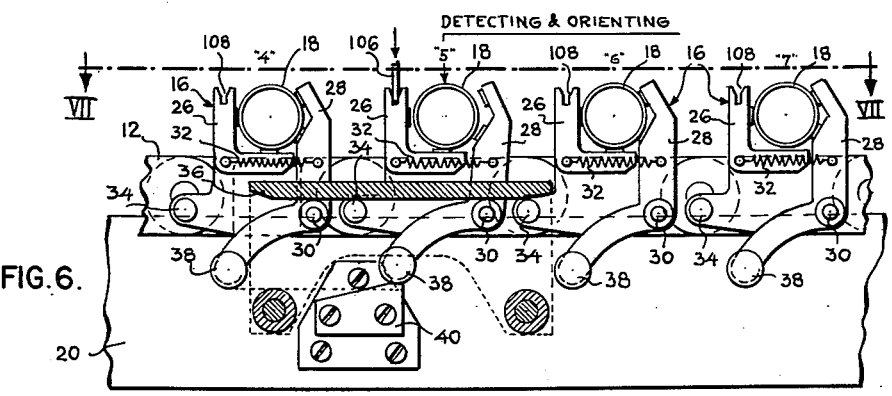
FIG. 6 is a fragmentary vertical-sectional view along the line VI—VI of FIG. 15 in the direction of the arrows and showing the details of the endless chains and heads adjacent Stations "4"–"7" of the threading machine.

This first reciprocating means for the guide rollers 94 comprises a lever 96 (which carries the guide rollers 94 and is pivoted at 98), a connecting rod 100 (provided with guide means 102) and a cam 104 on a cam shaft 66' driven by continuous drive means 68'. In order to properly seat the guide rollers 94 on the lamp 18, the lever 96 carries a locator 106 which is insertable into a cooperating locating slot 108 (FIGS. 5 and 15) on the fixed jaw 26 of the head 16 at Station "5."

To provide vertically reciprocable mounting for the drive roller 92, such second reciprocating mechanism for the drive roller 92 is provided with a casting 110 (FIG. 15) which is vertically reciprocable in a guide 112 in the frame 22 by means of a cam 114 on the cam shaft 66'. The drive roller 92 is mounted on a shaft 115 which is rotatable in the casting 110.

The drive means (FIGS. 15 and 16) utilized to rotate the shaft 115 and the drive roller 92 comprises a chain drive 116 connected by a lower sprocket 117 to the continuously rotating cam shaft 66'. This chain drive 116 is connected to the shaft 115 by a friction clutch 118 which is disposed between a top sprocket 117' of the chain drive 116 and a hub of the above-mentioned ratchet wheel 90. This ratchet wheel 90 is, of course, affixed to the shaft 115 and has its toothed portions aligned with the pawl 86 utilized to arrest the rotational movement of the ratchet wheel 90, the shaft 115 (secured to the ratchet wheel 90) and the drive roller 92 (carried by the shaft 115). As a result the lamp 18 ceases to rotate when the lead wires 42 arrive at the desired oriented position (FIGS. 2 and 10) and the pawl 86 arrests the ratchet wheel 90 (FIG. 13). The still rotating part of the friction clutch 118 (FIG. 15) thereafter rotates on the hub of the now-stationary ratchet wheel 90.

While the detector 50 (FIG. 17) is moving toward the lead wires 42, the first reciprocating mechanism for the guide rollers 94 moves the guide rollers 94 downwardly toward the lamp 18 and simultaneously therewith the second reciprocating mechanism moves the drive roller 92 upwardly toward the lamp 18.

At the time indicated by the centerline "B—B" in FIG. 17 the guide rollers 94, drive roller 92, and detector 50 are in the position shown in FIG. 11. Since the pawl 86 is not in engagement with the ratchet wheel 90, the drive roller 92 is rotating continuously in clockwise direction (FIG. 11).

When a point (indicated by the centerline "C—C" in FIG. 17) in the operating cycle of the orienting apparatus is reached, the drive roller 92 (FIG. 12) will have completed its upward movement through a distance "h" (FIGS. 12–14, 15, 16); the lamp 18 is then secured between the continuously rotating drive roller 92 and the guide rollers 94; and the lead wires 42 will have been rotated clockwise from the position shown in FIG. 11 to the position shown in FIG. 12, where one of such lead wires 42 is about to engage the detector 50.

At the time indicated by the centerline "D—D" in FIG. 17, the detector 50 has been rotated by one of the engaging lead wires 42 through the angle "α"; the lead wires 42 are then in the desired final oriented position (FIGS. 2 and 10); the solenoid 80 has been deenergized and the pawl 86 has engaged the ratchet wheel 90; and rotation of the drive roller 94, lamp 18 engaged thereby and the finally oriented lead wires 42 has been interrupted.

Thereafter, as indicated in FIG. 17 and shown in FIG. 14 and preparatory for indexing of the head 16 and lamp 18 from Station "5" to Station "6," the detector 50 and shield 52 are retracted to the dotted-line position shown in FIG. 8, where the magnets 70 (FIGS. 8–10) guarantee that the shield 52 and detector 50 connected thereto have returned to the starting vertical position, thereby again interrupting the path of incident light (from the light source 54) to the photo-electric cell 58 with resultant deenergization of the relay 74 (FIG. 18) and closure of the normally-closed contact 76. Simultaneously therewith the now stationary drive roller 92 and guide rollers 94 are retracted to the position shown in FIG. 14. However, to prevent energization of the solenoid 80 and resultant rotation of the drive roller 92 during the indexing of the head 16 and the lamp 18 carried thereby from Station "5" to Station "6," the microswitch 84 is opened by a cam 122 (FIG. 15) on the cam shaft 66' before such indexing movement begins.

At the time indicated by the centerline "E—E" in FIG. 17 the above-described elements of the orienting apparatus will have reached the positions shown in FIG. 14 while the lamp 18 is being indexed from Station "5" to Station "6." As shown in FIG. 17, the microswitch 84 is closed by the cam 122 just before the index of the head 16 is completed.

Figure 4:
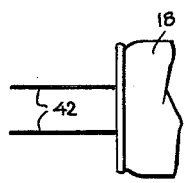
FIG. 4 is a view similar to FIG. 3 taken at Station "7," a wire-straightening station of the threading machine, and showing the straightened lead wires.

Thereafter, as indicated in FIG. 1, the oriented lead wires 42 on the left end of the lamp 18 (as viewed in FIG. 8) are straightened at Station "7" to the position shown in FIG. 4. At Station "9" a base 124 (FIG. 5) is threaded over the straightened lead wires 42. At Stations "10" and "12," the wire-straightening and base-threading operations are repeated with respect to the oriented lead wires 42 on the right side (FIG. 15) of the lamp 18. The lamp 18 with the bases 124 threaded over the lead wires 42 is unloaded from the threading machine at Station "27."

It will be appreciated that alternatively the required relative movement between the detector 50 and the lead wires 42 may be obtained by maintaining the detector 50 and shield 52 (mounted by means of the rod 44 on the slide 48) stationary and by providing a mechanism similar to the above-described detector reciprocating mechanism (FIG. 8) for moving the lamp 18 and the randomly disposed lead wires 42 on the right side of the lamp 18, as viewed in FIG. 8, into the path of movement of the detector 50.

It will be recognized by those skilled in the art that the objects of the present invention have been achieved by providing a threading machine of the horizontal type with an orienting apparatus that will efficiently orient the randomly disposed lead wires projecting from a fluorescent lamp in a desired position, preparatory for a subsequent lead-wire straightening operation while such threading machine is operating at a high production rate in the neighborhood of about 3600 threaded lamps per hour.

While in accordance with the patent statutes a preferred embodiment of the present invention has been illustrated and described in detail, it is to be particularly understood that the invention is not limited thereto or thereby.

I claim:

1. Lead-in wire orienting apparatus for a base-threading machine having a head for supporting a partially fabricated fluorescent lamp, electrical lead-in wires extending from opposite ends of said lamp, a longitudinal section of each of said lead-in wires disposed substantially in one plane passing through the longitudinal axis of said lamp, a reference plane passing through the longitudinal axis of said lamp, and a longitudinal section of each of said lead-in wires desired to be positioned substantially in said reference plane by said apparatus, said apparatus comprising, lamp-rotating means for rotating said lamp and said lead-in wires about the longitudinal axis of said lamp, rotatable wire-detecting means disposed when in operative position in the path of rotational movement of said lead-in wires and adapted to be contacted by and rotated by one of said lead-in wires, a light source for producing a directed beam of light, light-detecting means for receiving the beam of light emanated by said light source, light-shielding means connecting to said wire-detecting means and rotatable thereby and therewith, said light-shielding means when not rotated by said wire-detecting means disposed in light-shielding position between said light source and said light-detecting means, one of said lead-in wires when substantially longitudinally intersected by said reference plane acting to contact and rotate said wire-detecting means and to rotate said light-shielding means to permit the beam of light from said light source to strike said light-detecting means, and interrupting means actuated by said light-detecting means to stop rotation of said lamp and said lead-in wires by said lamp-rotating means when the beam of light from said light source strikes said light-detecting means.

2. Lead-in wire orienting apparatus for a base-threading machine having a head for supporting a partially fabricated fluorescent lamp, electrical lead-in wires extending from opposite ends of said lamp, a longitudinal section of each of said lead-in wires disposed substantially in one plane passing through the longitudinal axis of said lamp, a reference plane passing through the longitudinal axis of said lamp, and a longitudinal section of each of said lead-in wires desired to be positioned substantially in said reference plane by said apparatus, said apparatus comprising, lamp-rotating means for rotating said lamp and said lead-in wires about the longitudinal axis of said lamp, rotatable wire-detecting means adapted to be moved into operative position disposed in the path of rotational movement of said lead-in wires and adapted to be contacted by and rotated by one of said lead-in wires, a light source for producing a directed beam of light, light-detecting means for receiving the beam of light emanated by said light source, light-shielding means connecting to said wire-detecting means and rotatable thereby and therewith, said light-shielding means when not rotated by said wire-detecting means disposed in light-shielding position between said light source and said light-detecting means, one of said lead-in wires when substantially longitudinally intersected by said reference plane acting to contact and rotate said wire-detecting means and to rotate said light-shielding means to permit the beam of light from said light source to strike said light-detecting means, and interrupting means actuated by said light-detecting means to stop rotation of said lamp and said lead-in wires by said lamp-rotating means when the beam of light from said light source strikes said light-detecting means.

3. The apparatus as specified in claim 2, wherein said electrical lead-in wires comprise a pair of electrical lead-in wires extending from each end of said lamp.

4. The apparatus as specified in claim 2, wherein a slidable support carries said wire-detecting means, additional drive means acts to move said slidable support and said wire-detecting means into operative position disposed in the path of rotational movement of said lead-in wires, and synchronizing means causes said support to move said wire-detecting means into operative position before said lamp-rotating means is actuated to rotate said lamp.

5. The apparatus as specified in claim 2, wherein ratchet means is carried by said lamp-rotating means, and said interrupting means is responsive to the output signal of said light-detecting means to engage said ratchet means and stop rotation of said lamp.

6. The apparatus as specified in claim 2, wherein holding means is positioned in operative proximity to said light-shielding means for maintaining said light-shielding means in light-shielding position when not rotated by said wire-detecting means.

References Cited in the file of this patent
UNITED STATES PATENTS

| | | |
|---|---|---|
| 2,683,521 | Reynolds | July 13, 1954 |
| 2,853,108 | Hait | Sept. 23, 1958 |